UNITED STATES PATENT OFFICE.

WALTER KAEMPFE, OF GROSSENHAIN, GERMANY.

PROCESS FOR THE MANUFACTURE OF POLYMERIZED PRODUCTS FROM ANIMAL OILS.

1,121,926.          Specification of Letters Patent.      Patented Dec. 22, 1914.

No Drawing. Original application filed April 8, 1913, Serial No. 759,795. Divided and this application filed September 30, 1913. Serial No. 792,628.

*To all whom it may concern:*

Be it known that I, WALTER KAEMPFE, a citizen of the German Empire, residing at Grossenhain, in Saxony, Germany, have invented certain new and useful Improved Processes for the Manufacture of Polymerized Products from Animal Oils, of which the following is a specification.

This invention relates to the production of polymerized products from animal oils.

The object of the invention is to provide an improved process of the type in which an animal oil, for example, fish oil, or the like, for the purpose of obtaining a polymerized product, is fractionally hydrolyzed and the products of hydrolysis separated out. A known process of this type devised by the present applicant is carried out broadly in the following manner: The oil is heated in a retort for several hours to 235° to 240° C. and then steam at a temperature of 385° to 400° C. is blown through the retort. During the passage of steam through the retort the glycerids of the saturated fatty acids are hydrolyzed and their components distil off and the glycerids of the unsaturated fatty acids polymerize, but care has to be taken that during this process the temperature is not allowed to rise much above 260° to 285° C. for it has been found that above this temperature the unsaturated glycerids are liable to be decomposed. The duration of this latter process varied according to the iodin number of the oil, being between say 20 to 30 hours.

The invention consists broadly in effecting the fractional hydrolysis with the aid of a ferment capable of promoting the hydrolysis of fats, for example, castor oil ferment.

Further, the invention consists in effecting the fractional hydrolysis in the presence of manganese sulfate or the oxid, hydroxid or carbonate of an alkaline earth metal in addition to the said ferment, the said compounds being hereinafter referred to as agents promoting hydrolysis.

The polymerized products obtained are particularly adapted for use as linseed oil varnish substitutes and they may be had of various degrees of viscosity.

In carrying the invention into effect, to the fish oil, a quantity of castor oil ferment, and manganese sulfate, for example, are added. By means of suitable mechanical motion, an intensive emulsification at a low temperature is then obtained. After a suitable time the fatty acids crystallize out and are subsequently removed by pressure. Thereupon the liquid fatty acids are removed by distillation with superheated steam at a high temperature, and with or without the aid of a vacuum; there is thus formed an acid-free oil which is more or less viscous or fluid according to circumstances. One example of this process is as follows: To the fish oil is added about 30% water, and the temperature of the mixture is adjusted to 23° C. While stirring, 6% ferment and 0.2% manganese sulfate are now added. In order to maintain the emulsion, stirring is frequently resorted to. After about 15 hours, in which period about 35% of the mixture has become hydrolyzed, the process is stopped. During this period (within the 15 hours) acid samples are removed by the attendants who watch the process, and these samples on testing show that the saturated and the unsaturated glycerids having one double bond are considerably more easily hydrolyzed than those which have more than one double bond. The duration of the treatment of course varies according to the percentages of glycerids of the saturated and of the unsaturated acids having a single double bond contained in the oil. At the suitable low temperature of the room, the fatty acids now separate out in crystalline form and can be easily removed in known manner. These can be easily pressed out. In order to remove the liquid fatty acids remaining behind in the glycerids, the oil is thereupon subjected to distillation by steam at about 250° to 275°, until it is almost free of acids. At this temperature a final product which is comparatively liquid is obtained. If it is desired to produce a more viscous oil, superheated steam at a higher temperature must be employed.

At the temperatures mentioned in the above example relatively heavy oils are obtained with a correspondingly shorter period of distillation. It is obvious that pressing out may be dispensed with, in which case the whole of the reaction product is subjected to distillation.

Having now described my invention what I claim as new and desire to secure by Letters Patent is:—

1. The process for the production of polymerized products from animal oils which comprises hydrolyzing the more easily hydrolyzed glycerids in the oil with the aid of a ferment such as castor oil ferment, separating out the hydrolyzed products and polymerizing the residue.

2. The process for the production of polymerized products from animal oils which comprises hydrolyzing the more easily hydrolyzed glycerids contained in the oil with the aid of a ferment such as castor oil ferment, separating out the hydrolyzed products and polymerizing the residue with the aid of heat.

3. The process for the production of polymerized products from animal oils which comprises hydrolyzing the more easily hydrolyzed glycerids contained in the oil with the aid of a ferment such as castor oil ferment, separating out the hydrolyzed products and polymerizing the residue with the aid of superheated steam.

4. The process for the production of polymerized products from animal oils which comprises hydrolyzing the more easily hydrolyzed glycerids contained in the oil with the aid of a ferment such as castor oil ferment, separating out the hydrolyzed products and polymerizing the residue with the aid of steam at a temperature of 230 to 275° C.

5. The process for the production of polymerized products from animal oils which comprises hydrolyzing the more easily hydrolyzed glycerids in the oil with the aid of a ferment such as castor oil ferment in the presence of an agent promoting hydrolysis, separating out the hydrolyzed products and polymerizing the residue.

6. The process for the production of polymerized products from animal oils which comprises hydrolyzing the more easily hydrolyzed glycerids contained in the oil with the aid of a ferment such as castor oil ferment in the presence of an agent promoting hydrolysis, separating out the hydrolyzed products and polymerizing the residue with the aid of heat.

7. The process for the production of polymerized products from animal oils which comprises hydrolyzing the more easily hydrolyzed glycerids contained in the oil with the aid of a ferment such as castor oil ferment in the presence of an agent promoting hydrolysis, separating out the hydrolyzed products and polymerizing the residue with the aid of superheated steam.

8. The process for the production of polymerized products from animal oils which comprises hydrolyzing the more easily hydrolyzed glycerids contained in the oil with the aid of a ferment such as castor oil ferment in the presence of an agent promoting hydrolysis, separating out the hydrolyzed products and polymerizing the residue with the aid of steam at a temperature of 230 to 275° C.

9. A process for the production of polymerized products from fish oils comprising adding a quantity of water to the oil equivalent to 30 per cent. of the weight of the oil, adjusting the temperature of the mixture to 23° C. agitating the mixture, adding a weight of ferment capable of promoting hydrolysis of fats equivalent to 6 per cent. of the weight of the oil, adding manganese sulfate equivalent to 0.2 per cent. of the weight of oil, stirring the mixture for a prolonged period, separating out the hydrolyzed products and polymerizing the residue.

In testimony whereof I affix my signature in presence of two witnesses.

WALTER KAEMPFE.

Witnesses:
 PAUL ARRAS,
 CLÄRE SIMON.